Figure 1:
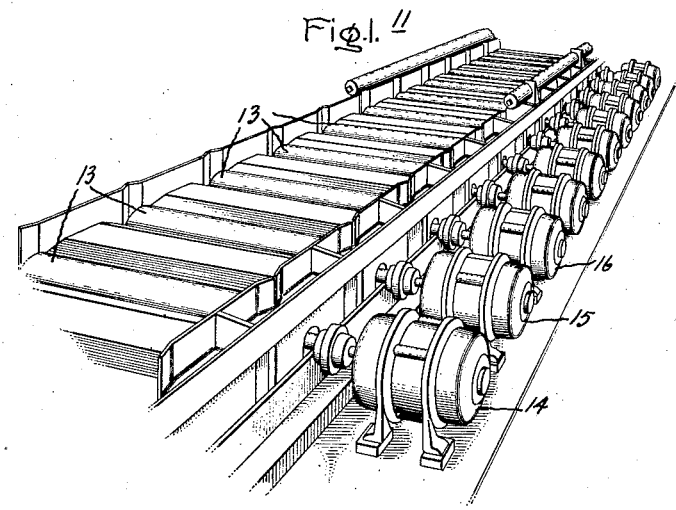

Oct. 10, 1939.  L. A. UMANSKY  2,176,039
RUN-OUT TABLE DRIVE
Filed Dec. 4, 1937  2 Sheets-Sheet 1

Inventor:
Leonid A. Umansky,
by Harry E. Dunham
His Attorney.

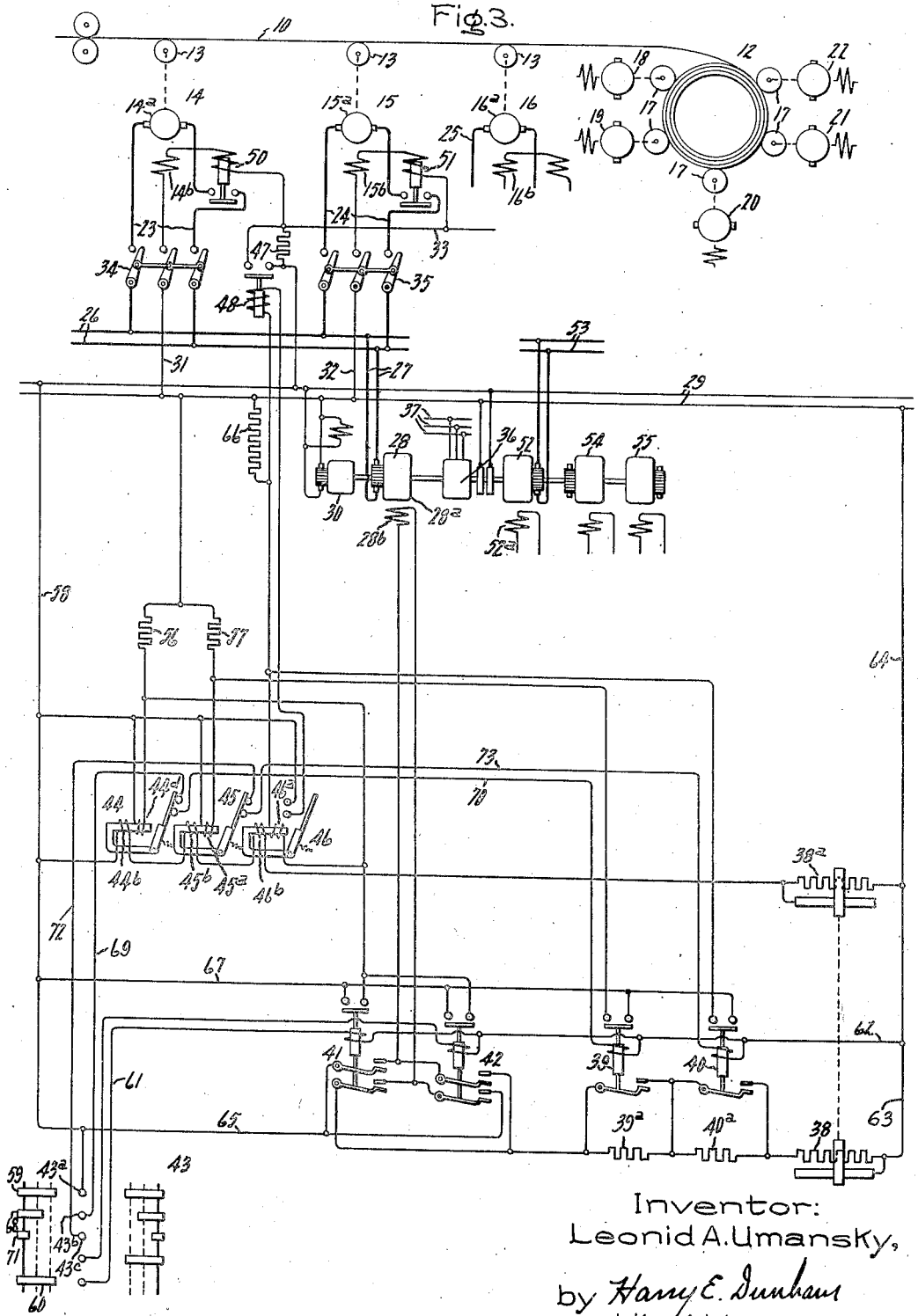

Patented Oct. 10, 1939

2,176,039

UNITED STATES PATENT OFFICE 2,176,039

RUN-OUT TABLE DRIVE

Leonid A. Umansky, Schenectady, N. Y., assignor to General Electric Company, a corporation of New York Application December 4, 1937, Serial No. 178,151

4 Claims. (Cl. 80—32)

This invention relates to equipment for driving the run-out tables and coilers of a steel mill, and it has for an object the provision of a simple, reliable and improved apparatus of this character.

A further object of the invention is the provision of a drive for run-out tables and coilers which will effect a substantial saving in power, building space and foundation work over the conventional type of drive used heretofore.

In run-out table and coiler drives heretofore used each table roller and coiler roller, or each pair of such rollers has been equipped with a separate squirrel cage induction motor. In order to provide speed adjustment an adjustable frequency motor generator set was provided for supplying these squirrel cage motors. This motor generator set consisted of a direct current motor mechanically coupled to an alternating current generator. Speed adjustment was obtained by varying the speed of the D. C. motor to vary the frequency of the A. C. generator voltage. Since commercial D. C. power was generally not available in mill areas, the direct current motor of this set was in turn supplied from a second motor generator set comprising a direct current generator and an A. C. motor supplied from the alternating current supply source. Thus five separate pieces of energy conversion apparatus and five energy conversions were provided between the alternating current source and the shaft of each run-out table roller or coiler roller. Run-out table and coiler drives as set forth in the foregoing have been conventional and standard in the art for more than a quarter of a century and as far as I am aware, there have been no exceptions.

As a departure from prior practice in this art, the present invention provides a drive in which each run-out table roller and coiler roller is equipped with a direct current type motor. To provide speed adjustment, an adjustable voltage direct current generator is provided for supplying these motors, and the generator is driven by an alternating current motor of either synchronous or induction type supplied from the alternating current source. Thus it will be noted that in contrast to the conventional run-out table drive used heretofore requiring five separate pieces of energy conversion apparatus and five energy conversions between the source and roll shafts, my improved drive requires only three pieces of energy conversion apparatus between each roll shaft and the source and thus eliminates two pieces of energy conversion apparatus and two energy conversions.

The following comparison will illustrate the savings that will be effected by the present invention in a hot strip mill having an average monthly output of 60,000 tons. This mill is assumed to have a run-out table divided into five sections and two coilers, each of the table sections and coilers requiring independent speed adjustment. Actual watthour meter readings taken in similar mills using the conventional adjustable frequency motor generator sets and squirrel cage motor drives for the run-out table and coiler show an average power consumption per ton rolled of about 4 kw.-hours, measured at the D. C. bus which supplies power to the adjustable frequency sets. In the course of a year this power consumption amounts to 12×60,000×4=2,880,000 kw.-hours. At the A. C. supply bus this will amount to approximately 3,300,000 kw.-hours.

The average efficiency of A. C. to D. C. motor generator sets is estimated at 88%. The average efficiency of the adjustable frequency sets of the conventional system is substantially lower by as much as 10–12%. Thus the extra power consumption of the conventional system may easily amount to 20–25% of the above amount, or approximately 700,000 kw.-hours per year.

Furthermore, the direct current motors when accelerated and decelerated by applied voltage are free from acceleration and deceleration losses that are inherent in squirrel cage induction motors. A conservative estimate is that in a period of a year on a drive, handling about 60,000 tons per month, the power saving will amount to 700,000 kw.-hours or more. Thus the total power saving will amount to 1,400,000 kw.-hours per year. At .07 cent per kw.-hour the saving will approximate $10,000 per year.

The conventional drive for the five-section table and two coilers assumed will require from five to seven adjustable frequency sets, depending on the operating method used. An additional A. C. to D. C. set will be also required to supply D. C. dynamic braking for the squirrel cage motors. In the improved drive for the same table and coilers from five to seven D. C. generators will be required which can be combined into one or two sets driven by one A. C. motor or two A. C. motors, supplied directly from the commercial A. C. source and thus there is no need for any additional motor generator capacity for supplying power to these sets. Likewise a separate dynamic braking set is not required since regenerative braking can be readily used with D. C. motors driving table and coilers. Thus the first cost of conversion equipment for the improved drive is obviously less than for the conventional drive. This saving in the first cost is more often than not greater than extra cost of the D. C. motors as against the squirrel cage motors.

The adjustable frequency motor generator sets in the above example, together with the dynamic braking set and control equipment will occupy about 4500 sq. ft. of floor area. The motor generator set or sets of the improved drive and the corresponding control equipment will be easily accommodated by one-third of this space, thus saving 3000 sq. ft. of floor area. Allowing, as a conservative estimate, $5.00 per square foot of the substation, including foundations, etc., the saving will be not less than $15,000.

Another object of the invention is the provision of an improved drive for run-out tables and the like in which a plurality of time delay contactors are employed for accelerating the motors to presettable values of speed and for which provision is made for obtaining the same maximum rate of acceleration, irrespective of the speed value for which the control has been preset.

Figure 2:
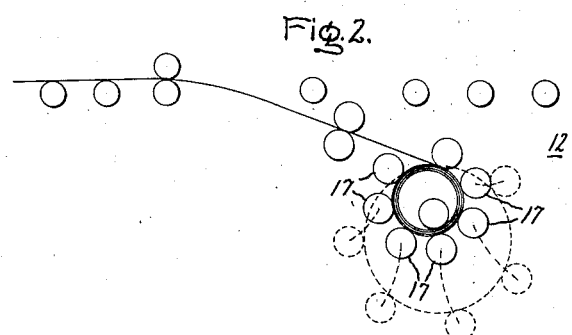

For a better and more complete understanding of the invention, reference should now be had to the following specification and to the accompanying drawings in which Fig. 1 is a view in perspective of a steel mill run-out table, Fig. 2 is a simple diagrammatical illustration of a strip coiler, and Fig. 3 is a simple diagrammatical illustration of the improved run-out table and coiler drive.

Referring now to the drawings, a hot steel strip 10 after being passed through a rolling mill is passed over a run-out table 11 to a strip coiler 12. A run-out table of this character may be several hundred feet long and is divided into a number of sections. Each section of such a table has a plurality of rollers 13. These rollers are individually driven by a plurality of direct current motors 14, 15, 16 etc. to the drive shafts of which the roller shafts are connected by suitable couplings as illustrated in Fig. 1. From the run-out table the strip passes to the coiler 12 comprising a plurality of rollers 17 which bear against the periphery of the coil. These rollers are driven individually or in pairs by a plurality of direct current motors 18, 19, 20, 21 and 22 to wind the strip into a coil. The construction and arrangement of a coiler is such that as the coil builds up, the rollers and their drive motors move outwardly from their initial positions to their final positions illustrated in dotted lines in Fig. 2. Since the structure of the coiler per se constitutes no part of the present invention, it is illustrated merely diagrammatically in the drawings.

The roller drive motors 14, 15, 16 etc. have armatures 14$^a$, 15$^a$, 16$^a$ and direct current field windings 14$^b$, 15$^b$, 16$^b$. The coiler motors are similar in structure to the roller drive motors as indicated.

The armatures 14$^a$, 15$^a$, 16$^a$ of roll drive motors 14, 15, 16 etc. are connected by means of electrical connections 23, 24, 25 to a bus 26 which in turn is connected by means of conductors 27 to the armature of a direct current generator 28 illustrated diagrammatically as comprising an armature 28$^a$ and a direct current field winding 28$^b$. The field windings of the roll drive motors 14, 15, 16 etc. are connected to an excitation bus 29 which in turn is connected to the armature of an exciter 30. Although not shown in the drawings, the field windings of the coiler motors are also connected to excitation bus 29. One terminal of each of these field windings is connected by means of individual conductors 31, 32 etc. to the excitation bus while the other terminal is connected to a common conductor 33 which in turn is connected to the opposite side of the excitation bus. In view of the large number of motors, a plurality of common conductors similar to conductor 33 may be provided each of which is connected to the field windings of a group of the motors. Such a group may comprise all the motors for one of the table sections.

Suitable switching devices 34, 35 are provided for interrupting the armature and field circuit connections between the roll drive motors 14, 15, 16 and the busses 26 and 29. These switching devices are preferably three-pole air circuit breakers. Although not shown, the first and third, i. e. the outside poles of each of these circuit breakers, are equipped with overload trips to protect both sides of the motor armature circuits, and the second or middle pole is connected in the field circuit of the same motor but is not equipped with an overload trip. Thus, whenever the motor breaker trips on overload, the field is also automatically deenergized.

Generator 28 is driven by an alternating current motor 36 diagrammatically illustrated as a synchronous motor having a stator winding supplied from a suitable commercial source of alternating current represented by the three supply lines 37 and having a direct current field winding (not shown) supplied with direct current excitation from a suitable source such as the excitation bus 29 which is supplied from the exciter 30. The acceleration, operating speed and direction of rotation of the roll drive motors 14, 15, 16 are controlled by controlling the excitation of the generator 28 and the polarity of the generator voltage. For these purposes resistors 39$^a$ and 40$^a$ and a speed adjusting rheostat 38 and suitable reversing switching mechanism are included in circuit with the field winding 28$^b$ of generator 28. Resistors 39$^a$ and 40$^a$ are controlled, i. e. either inserted in the field circuit or short circuited by means of electromagnetic contactors 39, 40 respectively. Ordinarily, the rheostat 38 is preset for the desired value of generator voltage corresponding to the desired speed of the roll drive motors which is desired at any given time. The rheostat is not used every time the motors are started or stopped. For this purpose the resistors 39$^a$, 40$^a$ and the accelerating contactors 39, 40 are employed. Although only two accelerating resistors 39$^a$, 40$^a$ and associated contactors 39, 40 are illustrated in the drawings, it will be understood that as many accelerating steps as are necessary may be employed.

Reversing contacts 41, 42 are provided for controlling the polarity of the generator field, and thereby to control the polarity of the generator voltage and the direction of rotation of the roll drive motors.

The reversing contactors 41, 42 and the field accelerating contactors 39, 40 are controlled from a suitable master switching device illustrated as a drum type multi-position reversing master switch 43. The master switch is illustrated as a three-position master switch for both the forward and reverse directions of rotation. The operator can move the master switch handle to any one of the three running positions and hold it in that position. At position 1, (in the forward direction) only the forward contactor 41 is closed. On the second point of the master switch the first accelerating contactor 39 is also closed, and on the third point of the master switch the second accelerating contactor 40 is also closed. The operating coils of these contactors are connected in a conventional manner to the master switch.

The operator might easily move the master switch instantly from the central or off position to the last or third point. Unless time intervals were interposed between the closing of the accelerating contactors, the generator voltage would be built up too rapidly, and the roll drive motors, connected to an appreciable external inertia, (exceeding many times the $WR^2$ of the motors themselves) could not accelerate that fast and the air circuit breakers would unavoidably trip on overload. Therefore, timing of the accelerating cycle is necessary.

For this purpose the operating coils of the accelerating contactors 39, 40 are also controlled by definite time relays 44, 45, 46. Each of these relays comprises a stationary U-shaped core member, a movable armature member carrying a contact biased by a spring to the closed position except the contactor of relay 46 which is spring biased to the open position, and a pair of coils designated with the number of the relay followed by the subsequent $a$ and $b$ respectively. The operating coils $44^a$, $45^a$, and $46^a$ are shown connected across the excitation bus 29 through suitable resistors, and the coils $44^b$, $45^b$, and $46^b$ are connected in series relationship with each other and in series with the supplementary section $38^a$ of the rheostat 38 to the excitation bus 29. As pointed out in the foregoing, the field windings $14^b$, $15^b$, $16^b$ of a group of the motors comprising, for example, the motors driving the rolls of one section of the table are connected to a common conductor 33. This common conductor 33 is connected through a ballast resistor 47 to one side of the excitation bus 29, while the opposite terminals of the motor field windings are connected to the opposite side of the bus 29.

The motor field windings themselves are designed to be normally excited at a lower voltage than the voltage of the excitation bus 29 so that normally a resistor 47 will be included in the circuit. However, when the motors are started from rest and accelerated as rapidly as their available torques permit, it is advantageous to overexcite these motors temporarily and for this purpose the contactor 48 is provided for short circuiting the resistor 47. This contactor is controlled by the accelerating relay 46. The control is so arranged that as soon as one of the directional contactors 41 or 42 is closed, the relay 46 is closed and energizes the operating coil of the contactor 48 so that this contactor closes and short circuits the resistor 47. However, after the last accelerating contactor 40 has closed, the relay 46 opens its contacts and causes the contactor 48 to open its contacts and reinsert the resistor 47 in the field circuits of the roll drive motors, so that the motors will thereafter run with their normal excitation.

The roll drive motors 14, 15 etc. are provided with protective contactors 50, 51 etc. Each of these contactors has contacts in the armature circuit of the associated motor and has an operating coil in circuit with the field winding of the associated motor.

The roll drive motors 18, 19, 20, 21, 22 for the coiler 12 are supplied from a generator 52 mounted on the same shaft with the generator 28 and driven by the synchronous motor 36. The armature of generator 52 is connected to supply buses 53 similar to the buses 26, and the armatures and field windings of the coiler roll drive motors are connected to the bus 53 and excitation bus 29 respectively in a manner identical with that in which the armatures of the table roll drive motors are connected to supply bus 26 and excitation bus 29 respectively.

As shown, the generator 52 is provided with a field winding $52^a$ which is controlled by a master switch and control apparatus controlled thereby that is similar in all respects to the master switch 43 and the apparatus controlled thereby for controlling the excitation of generator 28.

Two additional generators 54, 55 are also mounted on the same shaft as generators 28 and 52 and driven by the synchronous motor 36. These generators supply the roll drive motors for two other sections of the run-out table, and their field circuits are provided with control apparatus identical with that described for the generator 28.

A similar motor generator set comprising a synchronous motor similar to the motor 36 and a plurality of generators driven by this synchronous motor is provided for supplying the roll drive motors of the remaining coiler and the remaining sections of the run-out table. The control for these generators is the same as for generator 28.

With the foregoing understanding of the apparatus and its organization and interconnections, the operation will readily be understood from the following description.

The synchronous motor 36 is started in a conventional manner and the air circuit breakers 34, 35 are actuated to their closed positions. With the exciter 30 operating at full speed, normal excitation voltage is supplied to the excitation bus 29. The operating coils $44^a$ and $45^a$ of accelerating relays 44 and 45 are connected in parallel through the resistors 56 and 57 to the excitation bus 29. Similarly the operating coils $44^b$, $45^b$, and $46^b$ are connected in series relationship through a section $38^a$ of the rheostat to excitation bus 29. As a result, the movable contacts of the relays 44 and 45 are held in their open positions against the tension of their operating springs. Since the operating coil $46^a$ of relay 46 is not energized, its movable contact member is held in the open position by its operating spring as illustrated.

Assuming that it is desired to run the roll drive motors in the forward direction, the master switch 43 is actuated to the first forward running position. In the first position of the master switch a circuit is established for the operating coil of the forward contactor 41 which circuit is readily traced from the upper side of excitation source 29 through conductor 58 to the finger $43^a$ and the power segment 59 of the master switch, forward segment 60, conductor 61, operating coil of forward contactor 41, and thence by conductors 62 and 64 to the opposite side of bus 29. Contactor 41 closes in response to energization and connects the field winding $28^b$ of generator 28 to the excitation bus 29 through conductors 58, 65, upper contact of contactor 41 through field winding $28^b$, lower contact of contactor 41, resistors $39^a$ and $40^a$ speed adjusting rheostat 38 (previously set for the desired value of running speed), conductors 63 and 64 to the excitation bus 29. In the closed position of forward contactor 41, the upper interlock contact completes a circuit for the coil $46^a$ of relay 46 which is traced from the lower side of the excitation bus 29 through resistor 66, coil 46ª, upper interlocks of contactor 41 in the closed position, and thence by conductors 67 and 58 to the upper side of excitation bus 29. In response to energization, relay 46 closes it contact against the tension of the operating spring to complete an energizing circuit for the contactor 48 which thereupon closes its contacts to short circuit the resistor 47 in circuit with the field windings of the roll drive motors 14, 15, 16. In designing the roll drive motors, it is very often necessary to cope with space limitations. This forces the designers to crowd the field windings into a very limited space, and this results in a rather definite limit on the flux and, therefore, on the torque of the motors. A high torque is essential for acceleration and deceleration, but is not essential for normal running. Therefore, it is very advantageous to operate these motors somewhat underexcited so as to keep the internal losses as low as possible, and yet have the maximum available flux and torque at the time when these are necessary, i. e. during acceleration and retardation. The closing of the contactor 48 upon the first point of the master switch permits the motors to exert temporarily their maximum possible torque per ampere drawn by the armatures. Or to put it differently, for each ampere drawn by the motor armature from the generator, the motor can exert a larger torque. Therefore, the motors and the generators will commutate better, everything else being equal. The arrangement described is equivalent to a compound winding on the motors, which cannot be utilized for both directions of rotation when the motor is supplied from a variable voltage generator.

It will also be observed that in the closed position of the forward contactor 41 the upper interlocks establish a short circuit about the operating coil 44ª of relay 44. This causes the magnetic flux of the relay to decay and after a definite time interval it will decay to such an extent that the operating spring will cause the normally closed contacts of the relay to complete a circuit for the operating coil of accelerating contactor 39, providing the master switch has by this time been moved to the second operating. Assuming the master switch in the second operating position, the circuit for the operating coil of accelerating contactor 39 is traced from the power segment 59 to segment 68, finger 43ᵇ, conductor 69, normally closed contacts of accelerating relay 44, conductor 70, operating coil of accelerating contactor 39, and thence by conductors 62 and 64 to the excitation bus 29. As a result of energization, contactor 39 closes its contacts to short circuit the accelerating resistor 39ª thereby to increase the voltage of the generator 28 and the speed of the motors 14, 15, 16.

In the closed position of accelerating contactor 39, the upper interlocks establish a short circuit about the operating coil 45ª of accelerating relay 45 and after a definite time interval required for the decay of the flux of this relay, the contacts are closed by the operating spring to establish a circuit for the operating coil of accelerating contactor 40 provided that by this time the master switch 43 has been operated to the third position. Assuming the master switch in its third forward position, the circuit for the operating coil of contactor 40 is traced from the power segment 59 to segment 71, finger 43ᶜ, conductor 72, normally closed contacts of relay 45, conductor 73, operating coil of accelerating contactor 40, and thence by conductors 62, 63, and 64 to the excitation bus 29. Contactor 40 responds to energization and closes its contacts to short circuit resistor 40ª, thereby further increasing the excitation of the generator 28 and further increasing the speed of the roll drive motors 14, 15, 16. Roll drive motors accelerate to a speed determined by the setting of the rheostat 38 which is not short circuited and remains in the field circuit of the generator 28.

In the closed position of contactor 40, the upper interlocks complete a short circuit about the operating coil 46ª of accelerating relay 46 and after a definite interval of time required for the decay of the flux of this relay, this relay opens its contacts, thereby to interrupt the circuit for the operating coil of contactor 48. Contactor 48 thereupon opens its contacts and reinserts the resistor 47 in the field circuit of roll drive motors 14, 15, 16. This results in underexciting the roll drive motors and thereby decreasing their torques to the value required during normal running operation.

In the absence of the coils 44ᵇ, 45ᵇ, and 46ᵇ, and the supplementary sections 38ª of rheostat 38, the same definite time delay would be interposed between the closing of contactors 39, 40, and 48 irrespective of the maximum operating speed for which the rheostat 38 was preset. This is not, however, what is desired in order to obtain the best operating results. If the rheostat 38 is set at its extreme left-hand position in order to provide the maximum operating speed of the roll drive motors, the time intervals between the closing of the accelerating contactors should be maximum. When the rheostat is set at a lower operating speed, the accelerating contactors should close more rapidly in order that the rate of acceleration shall be the same as when the rheostat 38 was set for maximum speed. It is for this purpose that the accelerating relays 44, 45, 46 are equipped with the auxiliary coils 44ᵇ, 45ᵇ, and 46ᵇ and with the supplementary sections 38ª of the rheostat for varying the excitations of these auxiliary coils in accordance with the speed setting of rheostat 38. These auxiliary coils are arranged to act as bucking coils on the relays so that the stronger the exciting current flowing in these coils, the smaller will be the magnetic flux threading the cores and armatures of the relays, and the shorter will be the time that is required for these relays to drop out after the operating coils 44ª, 45ª, and 46ª have been short circuited. In this manner it is possible to maintain substantially the same rate of acceleration of the roll drive motors irrespective of whether these motors are accelerated to their full speed or to some reduced value.

In case of loss of excitation or interruption of the field circuit from any cause of any of the roll drive motors 14, 15, 16, the corresponding contactor 50, 51 will open its contacts and interrupt the armature circuit of the motor and thereby prevent dangerous overspeeding.

The roll drive motors for the coiler 12 are started in a manner identical with that described for the table drive motors.

When it is desired to stop the motors, the master switch 43 is operated from its full speed position to its central or off position. As the voltage of the generator 28 is reduced, the roll drive motors 14, 15, 16 act as generators and supply current to the generator 28 which now acts as a motor and drives the motor 36 as a generator to return energy to the source 37. This regenerative action of the roll drive motors of course, produces a braking torque with the result that the speeds of the motors are rapidly reduced. If desired, dynamic braking resistors may be provided and the speed of the motors reduced by dynamic braking. Whichever form of braking is utilized, no additional motor generator set is required as in the conventional drive used heretofore.

Assuming that regenerative braking is utilized, as explained in the foregoing, it may be desirable to control the reduction of the excitation of the generator field in a series of steps separated by time intervals. In this event time delay means identical with those described for interposing time delays during acceleration are employed. Such means, however, are omitted from the drawings so as not to unduly complicate it.

Although in accordance with the provisions of the patent statutes the principle of this invention has been explained and the structure described and explained which embodies the best mode in which it is now contemplated applying the principle of the invention, it will be understood that the apparatus and elements and connections shown and described are merely illustrative and that the invention is not limited thereto, since alterations and modifications will readily suggest themselves to persons skilled in the art without departing from the true spirit of this invention or from the scope of the annexed claims.

What I claim as new and desire to obtain by Letters Patent of the United States is:

1. In combination with a hot strip steel mill run-out table and coiler, each having a plurality of conveyor rolls, a plurality of direct current motors connected to drive said rolls, each of said motors having an armature and a field winding, a source of excitation having a voltage sufficient to overexcite said windings a substantial amount, resistance in circuit with said windings for reducing the excitation thereof to normal full running speed value, a direct current generator having an armature and a field winding, electrical connections from the armature of said generator to the armatures of said motors, an adjustable resistor connected in the field circuit of said generator, and a master switch and means controlled thereby for short circuiting said resistance and said resistor to accelerate said motor and for subsequently interrupting the short circuit about said motor field resistance.

2. In combination with a steel mill run-out table and coiler each having a plurality of conveyor rolls, a plurality of direct current motors connected to drive said rolls, each having an armature and a field winding, a source of excitation having a voltage sufficient to overexcite said windings a substantial amount, resistance in circuit with said windings for reducing the excitation thereof to normal full speed running value, a direct current generator having an armature and a field winding, electrical connections from the armature of said generator to the armatures of said motors, an adjustable resistor connected in the field circuit of said generator, a rheostat in said generator field circuit for presetting operating speeds for said motors, a master switch and means controlled thereby for short circuiting said motor field resistance and said adjustable resistor to accelerate said motor and subsequently removing the short circuit from said motor field resistance in a series of steps separated by time intervals, and means for varying said time intervals in accordance with the speed setting of said rheostat.

3. In combination with a hot strip mill run-out table and a coiler, each having a plurality of conveyor rolls, a plurality of direct current motors connected to drive said rolls, each of said motors having an armature and a field winding, a source of excitation having a voltage sufficient to overexcite said windings a substantial amount, resistance in circuit with said windings for reducing the excitation thereof to normal full speed value, a direct current generator having an armature and a field winding, electrical connections from the armature of said generator to the armatures of said motors, an adjustable resistor connected in the field circuit of said generator, a rheostat in the generator field circuit for presetting running speeds for said motors, a master switch and a plurality of contactors controlled thereby for short circuiting said motor field resistance and for progressively short circuiting said adjustable resistor to accelerate said motor and for subsequently interrupting the short circuit about said motor field resistance, a plurality of relays for introducing time intervals between the successive operation of said contactors, each of said relays having an actuating coil and a bucking coil, and a variable resistance in circuit with said bucking coils and actuated by said rheostat for varying said time intervals in accordance with the speed setting of said rheostat.

4. In combination with a steel mill run-out table and a coiler each having a plurality of conveyor rolls, a plurality of direct current motors connected to drive said rolls, each of said motors having an armature and a field winding, a direct current generator having an armature and a field winding, electrical connections between the armature of said generator and the armatures of said motors, means for adjusting the voltage of said generator to adjust the speeds of said motors, and means for interrupting the armature circuit of each of said motors in response to failure of field current comprising a plurality of contactors, one associated with each of said motors and each having contacts in the armature circuit of the associated motor biased to the open position and an actuating coil connected in the field circuit of said motor for closing said contacts in response to current in said field circuit.

LEONID A. UMANSKY.